United States Patent
Lu et al.

(10) Patent No.: US 12,309,591 B2
(45) Date of Patent: May 20, 2025

(54) RANDOM DATA INTEGRITY PROTECTION IN A WIRELESS COMMUNICATION NETWORK

(71) Applicant: T-MOBILE INNOVATIONS LLC, Overland Park, KS (US)

(72) Inventors: Kun Lu, Bellevue, WA (US); Gregory David Schumacher, Holliston, MA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 369 days.

(21) Appl. No.: 17/739,461

(22) Filed: May 9, 2022

(65) Prior Publication Data
US 2023/0362648 A1  Nov. 9, 2023

(51) Int. Cl.
*H04L 29/06* (2006.01)
*H04W 12/106* (2021.01)
*H04W 48/18* (2009.01)

(52) U.S. Cl.
CPC ......... *H04W 12/106* (2021.01); *H04W 48/18* (2013.01)

(58) Field of Classification Search
CPC ............................ H04W 12/106; H04W 48/18
See application file for complete search history.

(56) References Cited

U.S. PATENT DOCUMENTS

| | | | |
|---|---|---|---|
| 7,921,463 B2 | 4/2011 | Sood et al. | |
| 8,010,780 B2 | 8/2011 | Sood et al. | |
| 8,483,090 B2 | 7/2013 | Yi et al. | |
| 9,055,442 B2 | 6/2015 | Deng | |
| 9,294,232 B2 | 3/2016 | Ostergaard et al. | |
| 10,123,210 B2 | 11/2018 | Nair | |
| 10,454,686 B2 | 10/2019 | Mildh et al. | |
| 11,228,905 B2 | 1/2022 | Wu et al. | |
| 2019/0394651 A1 | 12/2019 | Wifvesson et al. | |
| 2020/0037165 A1* | 1/2020 | Kunz | H04W 12/106 |
| 2020/0145876 A1* | 5/2020 | Dao | H04L 12/1407 |
| 2020/0296752 A1* | 9/2020 | Baek | H04W 28/0278 |
| 2023/0096809 A1* | 3/2023 | Yi | H04W 12/06 |
| | | | 726/6 |

FOREIGN PATENT DOCUMENTS

EP  3462795 A1 *  4/2019  ............ H04B 1/7143

* cited by examiner

*Primary Examiner* — Tri M Tran

(57) ABSTRACT

A wireless communication network serves random data integrity protection to a User Equipment (UE). A network controller selects the random data integrity protection for a UE session based on UE context. The network control signals the random integrity protection for the UE session to a wireless access node which signals the UE. A wireless access node generates data units for an interval. The wireless access node randomly selects ones of the data units to reach a downlink amount for the interval. The wireless access node converts the selected data units into integrity-protected units. The wireless access node wirelessly transfers the unprotected data units and the integrity-protected units to the UE. The UE determines the amount of the integrity-protected data units for the interval. The UE determines data integrity of the unprotected data units based on the amount of the integrity-protected units for the interval.

20 Claims, 10 Drawing Sheets

RANDOM DATA INTEGRITY PROTECTION IN A WIRELESS COMMUNICATION NETWORK

TECHNICAL BACKGROUND

Wireless communication networks provide wireless data services to wireless user devices. Exemplary wireless data services include user data messaging, machine-control, internet-access, media-streaming, and social-networking. Exemplary wireless user devices comprise phones, computers, vehicles, robots, and sensors. The wireless user devices execute user applications that use the wireless data services. For example, a phone may execute a messaging application that exchanges user messages and photos with other phones over the wireless communication networks.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), Bluetooth Low Energy (BLE), Low-Power Wide Area Network (LP-WAN), Internet-of-Things (IoT), Near Field Communications (NFC), and the like. The wireless access nodes exchange network signaling and user data with network elements that are often clustered together into wireless network cores. The wireless network elements comprise Access and Mobility Management Functions (AMFs), Service Management Functions (SMFs), Unified Data Management (UDM), and the like.

Data integrity protection assures the receiver that received data was not tampered with in transit from the transmitter. To use data integrity protection, the transmitter hashes the data with other factors to generate a hash result. The transmitter transfers the data and the hash result to the receiver. The receiver hashes the data and the other factors to generate the same hash result. If the hash results match, then data has been not tampered with in transit and passes the data integrity test. If the hash results do not match, then data has been tampered with in transit and the data fails the data integrity test. In 5GNR wireless access nodes and wireless user devices, Packet Data Convergence Protocols (PDCPs) apply integrity protection on a per data session basis. The wireless user devices may use integrity protection on some data sessions while avoiding integrity protection for other data sessions.

Unfortunately, the use of data integrity protection in the wireless user devices consumes significant battery power. The use of data integrity protection consumes processing resources and degrades performance for other user tasks.

TECHNICAL OVERVIEW

A wireless communication network serves random data integrity protection to a User Equipment (UE). A network controller selects the random data integrity protection for a UE session based on UE context. The network controller signals the random integrity protection for the UE session to a wireless access node which signals the UE. The wireless access node generates data units for an interval where the interval comprises a number of data units. The wireless access node randomly selects individual data units until a downlink amount is reached for the interval. The wireless access node converts the randomly-selected data units into integrity-protected data units. The wireless access node wirelessly transfers the unprotected data units and the integrity-protected data units to the UE. The UE determines the data integrity of the integrity-protected data units based on their integrity protection data. The UE determines the amount of the integrity-protected data units for the interval. The UE determines data integrity of the unprotected data units based on the amount of the integrity-protected data units for the interval.

DETAILED DESCRIPTION

Figure 1:
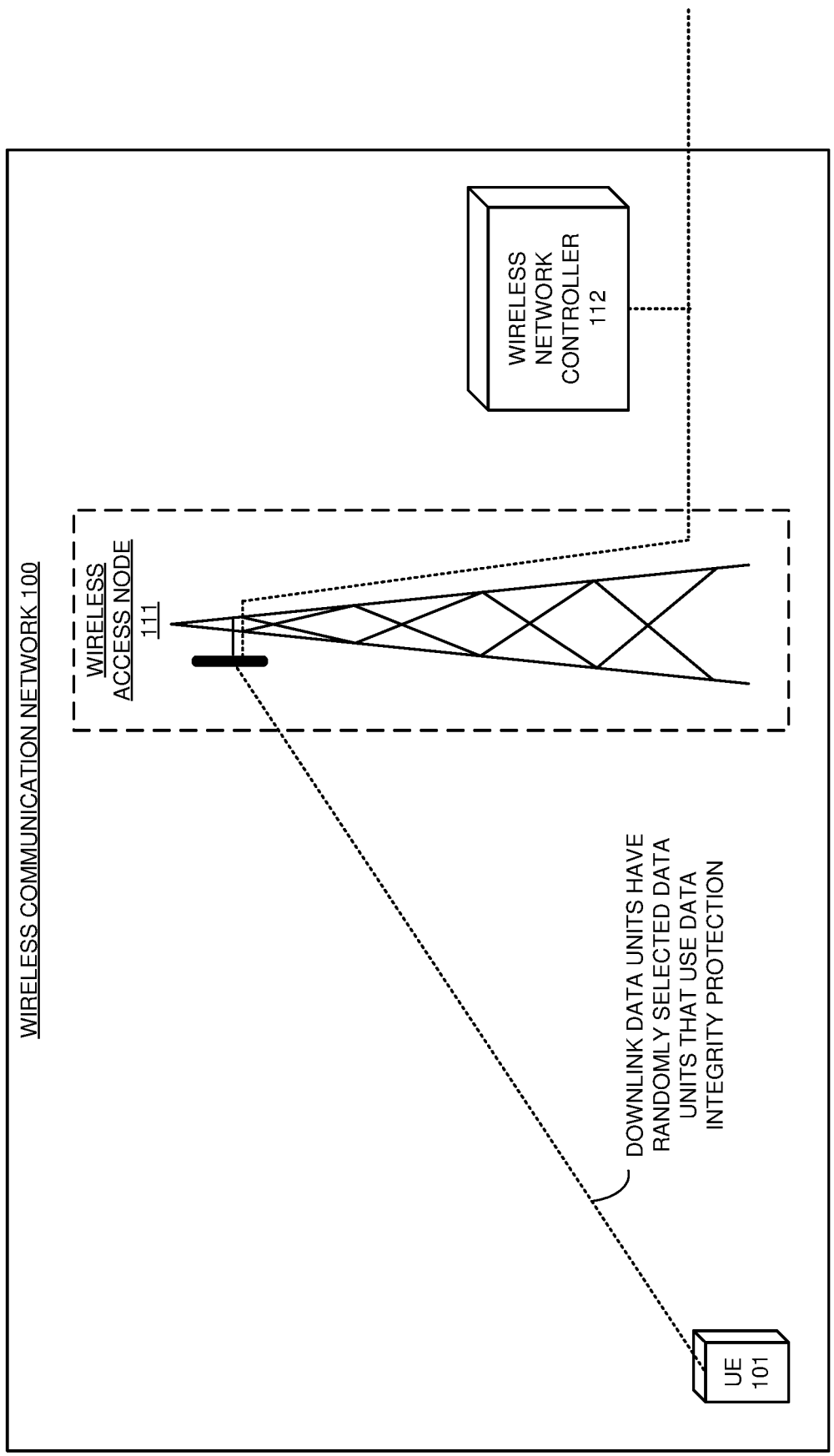
FIG. 1 illustrates an exemplary wireless communication network to serve random data integrity protection to wireless User Equipment (UEs).

FIG. 1 illustrates exemplary wireless communication network 100 to serve random data integrity protection to wireless User Equipment (UE) 101. Wireless communication network 100 comprises wireless UE 101, wireless access node 111, and wireless network controller 112. UE 101 comprises a computer, phone, sensor, vehicle, robot, or some other user appliance with wireless communication circuitry. Wireless access node 111 comprises a base station, hot spot, node-B, or some other network appliance with wireless communication circuitry. Wireless network controller 112 comprises an Access and Mobility Management Function (AMF), Session Management Function (SMF), Policy Control Function (PCF), and/or some other control-plane element. The number of UEs, access nodes, and network controllers shown on FIG. 1 is restricted for clarity and wireless communication network 100 typically includes many more UEs, access nodes, and controllers than shown.

Various examples of network operation and configuration are described herein. In some examples, UE 101 wirelessly attaches to wireless access node 111 and requests a UE session. In response to session request, network controller 111 develops UE context for the UE session like network addressing, quality-of-service parameters, and the like. Network controller 112 selects random data integrity protection for the UE session for UE 101 based on UE context. For example, network controller 112 may select the random data integrity protection for UE session based on a wireless network slice for the data session that is indicated by the UE context. Network controller 112 transfers network signaling to wireless access node 111 that indicates the UE context and the random data integrity protection for the UE session for UE 101. Wireless access node 111 receives the network signaling and wirelessly transfers UE signaling to UE 101 that indicates the random data integrity protection for the UE session. In some examples, the network signaling and the UE signaling indicate downlink amounts and downlink intervals for the random data integrity protection. An individual downlink interval comprises a number of consecutive downlink data units that have sequential sequence numbering. In response to the network signaling, wireless access node 111 generates downlink data units for the downlink interval. Wireless access node 111 randomly selects individual downlink data units to reach the downlink amount for the downlink interval. Wireless access node 111 converts the selected downlink data units into integrity-protected downlink data units. For efficiency, wireless access node 111 does not apply the integrity-protection to the other downlink data units in the interval.

Wireless access node 111 wirelessly transfers the unprotected downlink data units and the integrity-protected downlink data units to UE 101. In some examples, wireless access node 111 duplicates the integrity-protected downlink data units and wirelessly transfers the duplicate integrity-protected downlink data units to UE 101. UE 101 soft-combines the duplicate data units for increased reliability and accuracy. UE 101 determines the data integrity of the integrity-protected downlink data units based on their integrity data. UE 101 determines the downlink amount of the integrity-protected downlink data units for the downlink interval. A downlink data unit that has integrity protection data but fails integrity protection validation is not counted as one of the integrity-protected downlink data units for the downlink interval. UE 101 determines downlink data integrity of the unprotected downlink data units in the interval based on the downlink amount of the integrity-protected downlink data units in the downlink interval. For data integrity, the downlink amount of the integrity-protected downlink data units for the downlink interval should be greater or equal to the amount for the interval indicated by the UE signaling.

In some examples, network controller 112 selects random data integrity protection for the uplink in addition to, or instead of, the downlink integrity protection described above. Network controller 112 may select the random data integrity protection for the uplink based on the wireless network slice for the data session. Network controller 112 transfers the network signaling to wireless access node 111 to indicate the uplink random data integrity protection for the UE session for UE 101. Wireless access node 111 transfers UE signaling to UE 101 that indicates the random data integrity protection for the uplink. In some examples, the network signaling and the UE signaling indicate uplink amounts and uplink intervals for the random data integrity protection. An individual uplink interval comprises a number of consecutive uplink data units that have sequential sequence numbering. In response to the UE signaling, UE 101 generates uplink data units for the uplink interval. UE 101 randomly selects individual uplink data units to reach the uplink amount for the uplink interval. UE 101 converts the selected uplink data units into integrity-protected uplink data units but leaves the other uplink data units unprotected.

UE 101 wirelessly transfers the unprotected uplink data units and the integrity-protected uplink data units to wireless access node 111. In some examples, UE 101 duplicates the integrity-protected uplink data units and wirelessly transfers the duplicated integrity-protected uplink data units to wireless access node 111. Wireless access node 111 soft-combines the duplicate data units for increased reliability and accuracy. Wireless access node 111 determines the data integrity of the integrity-protected uplink data units based on their integrity data. Wireless access node 111 determines the uplink amount of the integrity-protected uplink data units for the uplink interval. An uplink data unit that has integrity protection data but fails integrity protection validation is not counted as one of the integrity-protected uplink data units for the uplink interval. Wireless access node 111 determines uplink data integrity of the unprotected uplink data units based on the uplink amount of the integrity-protected uplink data units for the uplink interval. For data integrity, the uplink amount of the integrity-protected uplink data units for the uplink interval should be greater or equal to the amount for the interval indicated by the UE signaling.

In some examples, UE 101 and wireless access node 111 execute Packet Data Convergence Protocols (PDCPs). PDCP sequence numbering can be used to identify the sequences of data units that comprise the intervals. PDCP sequence numbering can be used to detect missing data units. The PDCP in wireless access node 111 generates downlink data units for downlink intervals, randomly selects some of the downlink data units to reach downlink amounts for the downlink intervals, and converts the selected downlink data units into the integrity-protected downlink data units. The PDCP in UE 101 verifies the integrity of the integrity-protected downlink data units based on their integrity data. Any downlink data units that have integrity protection data but fail their integrity verification are not counted as integrity-protected downlink data units. The PDCP in UE 101 verifies the integrity of the unprotected downlink data units based on the amount of protected downlink data units in the downlink interval being greater or equal to the amount for the interval with the UE signaling. The PDCP in UE 101 generates the uplink data units for the uplink interval, randomly selects uplink data units to reach the uplink amount for the uplink interval, and converts the selected uplink data units into the integrity-protected uplink data units. The PDCP in wireless access node 111 verifies the integrity of the integrity-protected uplink data units based on their integrity data. Any uplink data units that have integrity protection data but fail their integrity verification are not counted as integrity-protected uplink data units. The PDCP in wireless access node 111 verifies the integrity of the unprotected uplink data units based on the amount of protected uplink data units in the uplink interval being greater or equal to the amount for the interval that is indicated by the UE signaling.

The uplink intervals and/or uplink amounts may be the same or different from the downlink intervals and/or downlink amounts. The intervals and amounts may be static or vary over time—even from one interval to the next. The intervals may be static and the amounts may vary or the amounts may be static and the intervals may vary.

Advantageously, the use of random data integrity protection in UE 101 conserves significant battery power. The use of random data integrity protection improves UE performance for other user tasks.

UE 101 and wireless access node 111 comprise radios that wirelessly communicate using a wireless protocol like Fifth Generation New Radio (5GNR), Institute of Electrical and Electronic Engineers (IEEE) 802.11 (WIFI), Long Term Evolution (LTE), Bluetooth Low Energy (BLE), Internet-of-Things (IoT), and Low-Power Wide Area Network (LP- WAN). UE 101, wireless access node 111, and wireless network controller 112 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, radio applications, and network applications. The microprocessors retrieve the software from the memories and execute the software to drive the operation of wireless communication network 100 as described herein.

Figure 2:
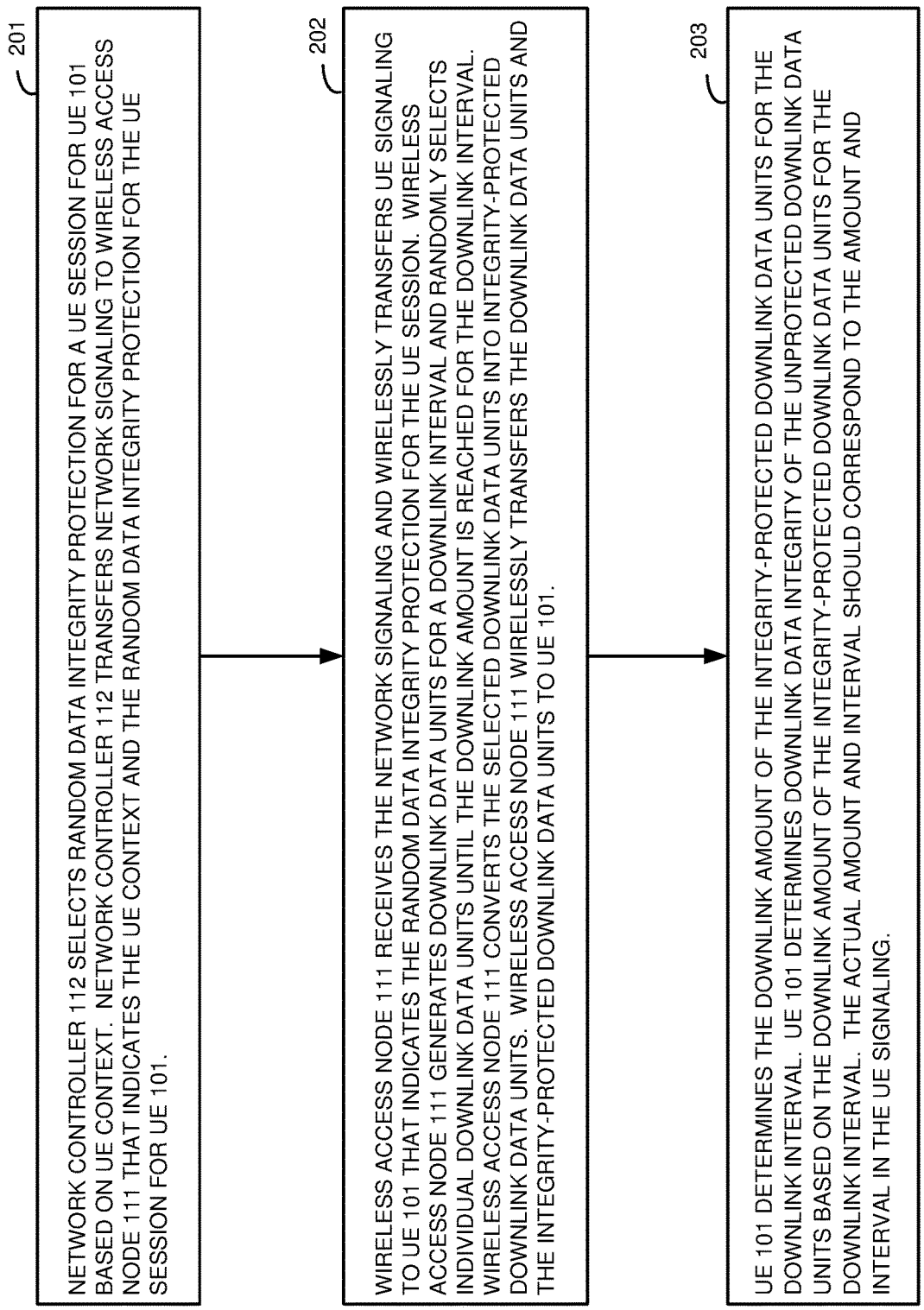
FIG. 2 illustrates an exemplary operation of the wireless communication network to serve the random data integrity protection to the wireless UEs.

FIG. 2 illustrates an exemplary operation of wireless communication network 100 to serve the random data integrity protection to wireless UE 101. The operation may differ in other examples. Network controller 112 selects random data integrity protection for a UE session for UE 101 based on UE context (201). Network controller 112 transfers network signaling to wireless access node 111 that indicates the UE context and the random data integrity protection for the UE session for UE 101 (201). Wireless access node 111 receives the network signaling and wirelessly transfers UE signaling to UE 101 that indicates the random data integrity protection for the UE session (202). Wireless access node 111 generates downlink data units for a downlink interval and randomly selects individual downlink data units until a downlink amount is reached for the downlink interval (202). Wireless access node 111 converts the selected downlink data units into integrity-protected downlink data units (202). Wireless access node 111 wirelessly transfers the downlink data units and the integrity-protected downlink data units to UE 101 (202). UE 101 determines the downlink amount of the integrity-protected downlink data units for the downlink interval (203). UE 101 determines downlink data integrity of the unprotected downlink data units based on the downlink amount of the integrity-protected downlink data units for the downlink interval. The actual downlink interval and amount should correspond to the downlink interval and amount specified in the UE signaling (203).

Figure 3:
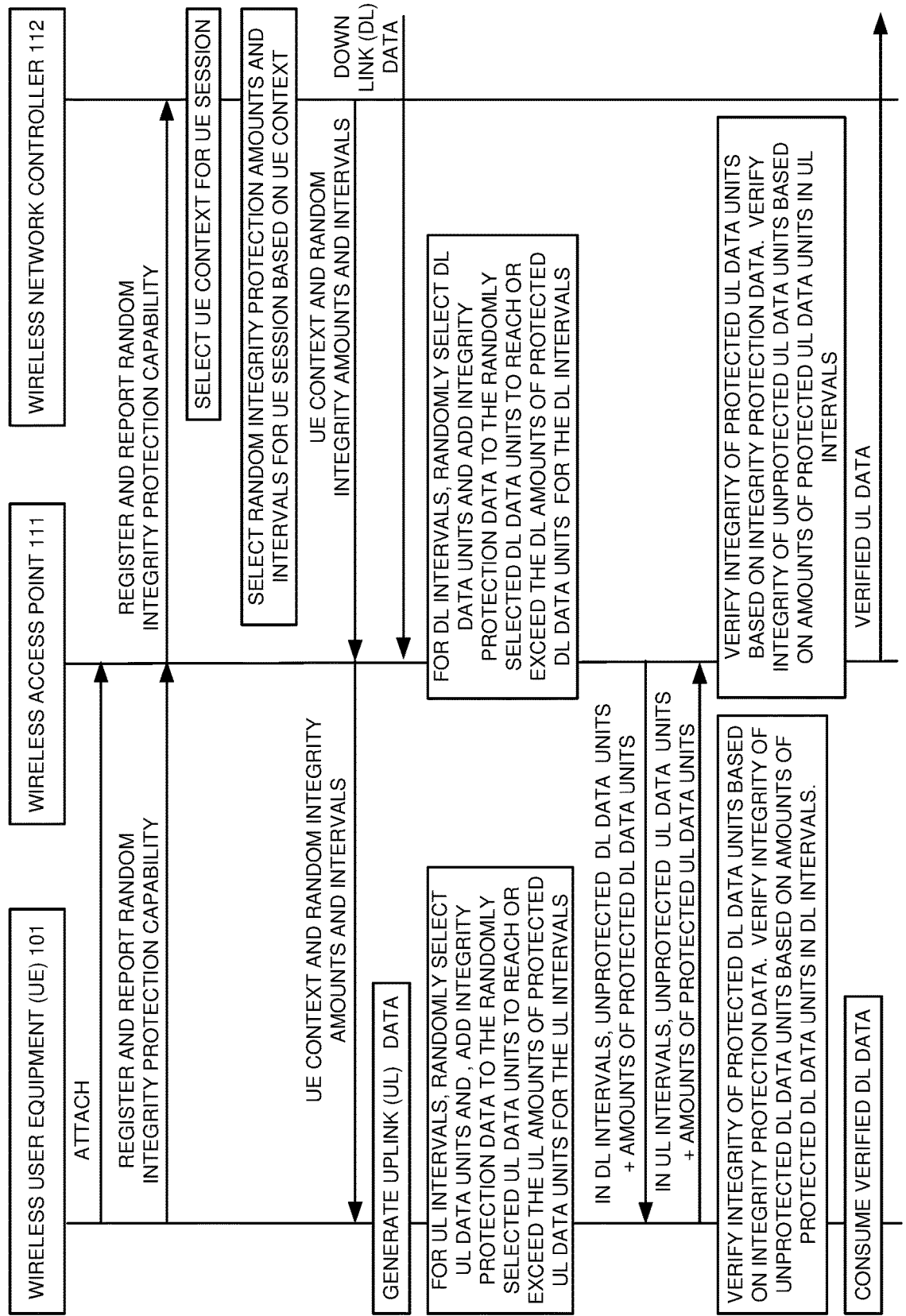
FIG. 3 illustrates an exemplary operation of the wireless communication network to serve the random data integrity protection to the wireless UEs.

FIG. 3 illustrates an exemplary operation of wireless communication network 100 to serve the random data integrity protection to wireless UE 101. The operation may differ in other examples. UE 101 wirelessly attaches to wireless access node 111. UE 101 registers with wireless network controller 112 over wireless access node 111. UE 101 reports its random integrity protection capability to wireless network controller 112. In response the registration and report, network controller 112 selects UE context for a UE session like network addresses, quality-of-service, and the like. In response to the report, network controller 112 selects random data integrity protection for the UE session for UE 101 based on the UE context. Network controller 112 transfers network signaling to wireless access node 111 that indicates the UE context and the random data integrity protection amounts and intervals for the UE session for UE 101.

Wireless access node 111 receives the network signaling and wirelessly transfers UE signaling to UE 101 that indicates the random data integrity protection amounts and intervals for the UE session. UE 101 generates Uplink (UL) data. UE 101 generates UL data units for the UL intervals and randomly selects individual UL data units to reach or exceed the UL amount for the UL interval. UE 101 converts the selected UL data units into duplicate integrity-protected UL data units.

Wireless access node 111 receives Downlink (DL) data for UE 101 from an external system. Wireless access node generates DL data units for the DL interval. Wireless access node 111 randomly selects individual DL data units until the DL amount is reached for the DL interval. Wireless access node 111 converts the selected DL data units into duplicate integrity-protected DL data units.

In the DL intervals, wireless access node 111 wirelessly transfers the unprotected DL data units and DL amounts of the duplicate integrity-protected DL data units to UE 101. UE 101 soft-combines the duplicate integrity-protected DL data units for increased reliability and accuracy. UE 101 determines the DL data integrity of the integrity-protected DL data units based on their integrity-protection data. UE 101 determines the DL amounts of the integrity-protected DL data units for the DL intervals. UE 101 determines DL data integrity of the unprotected DL data units based on the DL amounts of the integrity-protected DL data units for the DL intervals being equal to or greater than the DL amounts and intervals indicated in the UE signaling. UE 101 consumes the verified DL data.

In the UL intervals, UE 101 wirelessly transfer the unprotected UL data units and UL amounts of the duplicate integrity-protected UL data units to wireless access node 111. Wireless access node 111 soft-combines the duplicate UL data units for increased reliability and accuracy. Wireless access node 111 determines the UL data integrity of the integrity-protected UL data units based on their integrity-protection data. Wireless access node 111 determines the UL amounts of the integrity-protected UL data units for the UL intervals. Wireless access node 111 determines UL data integrity of the unprotected UL data units based on the UL amounts of the integrity-protected UL data units for the UL intervals being greater than or equal to the amounts and intervals indicated by in the UE signaling. Wireless access node 111 transfers the verified UL data to an external system (not shown).

Figure 4:
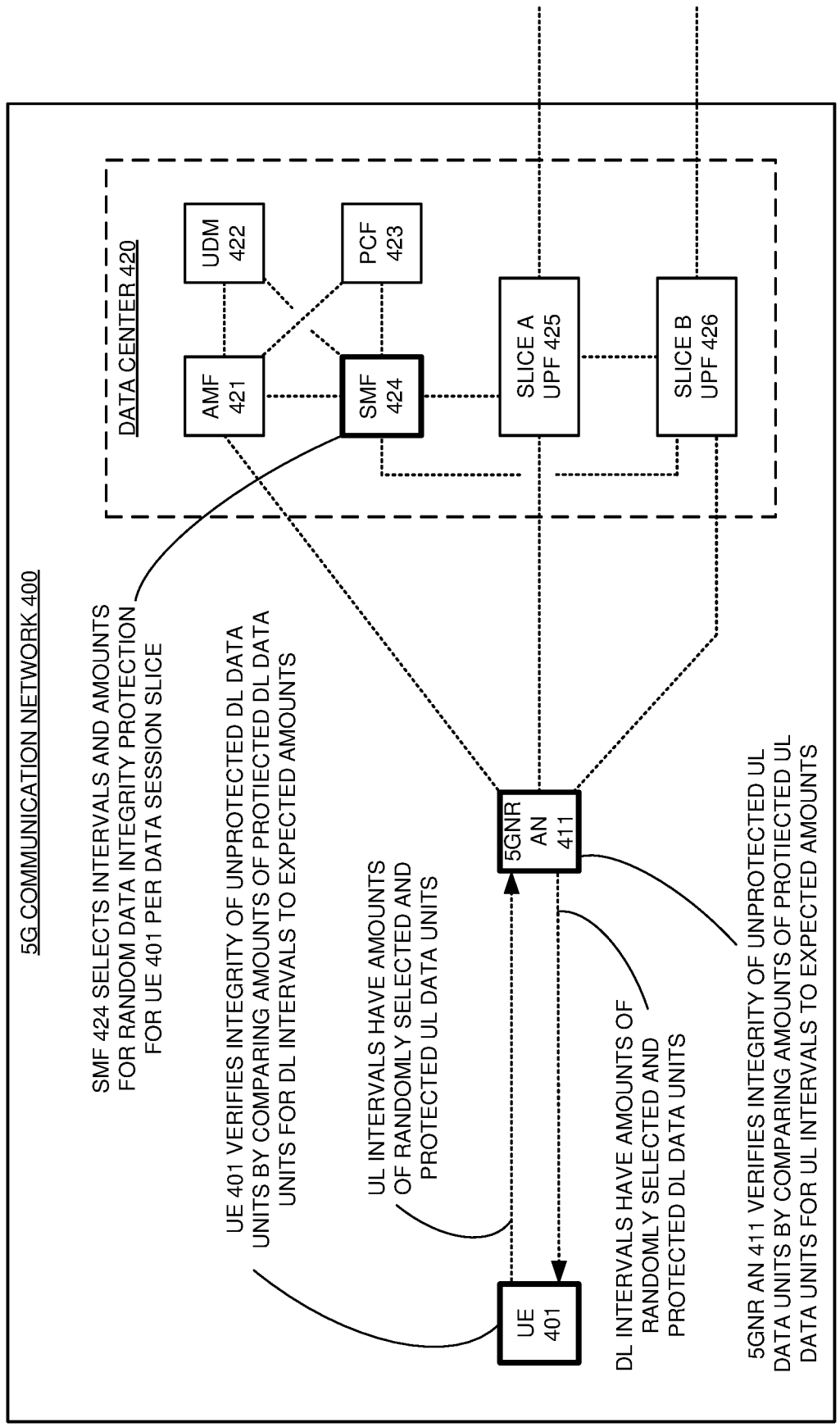
FIG. 4 illustrates an exemplary Fifth Generation (5G) communication network to serve random data integrity protection to 5G New Radio (NR) UEs.

FIG. 4 illustrates exemplary Fifth Generation (5G) communication network 400 to serve random data integrity protection 5G New Radio (NR) UE 401. 5G communication network 400 comprises an example of wireless communication network 100, although network 100 may differ. 5G communication network 400 comprises: UE 401, 5GNR AN 411, and network data center 420. Network data center 420 comprises Access and Mobility Management Function (AMF) 421, Unified Data Management (UDM) 422, Policy Control Function (PCF) 423, Session Management Function (SMF) 424, Slice "A" User Plane Function (UPF) 425, and Slice "B" UPF 426. Network data center 420 typically includes additional network functions like Network Repository Function (NRF) that are omitted for clarity.

UE 401 wirelessly attaches to 5GNR AN 411 and reports its random integrity protection capability. 5GNR AN 411 forwards the UE report of the random integrity protection capability to AMF 421. In response to successful registration and the report, AMF 421 interacts with UDM 422 to develop UE context like the selection network slices A and B—and AMF 421 may use a Network Slice Selection Function (NSSF) as well. AMF 421 interacts with PCF 423 to develop UE context like quality-of-service for network slices A and B. AMF 421 interacts with SMF 424 to develop UE context like network addresses for network slices A and B. AMF indicates the UE capability for random integrity protection to SMF 424, and in response, SMF 424 selects random integrity protection profiles for UE 401 for network slices A and B. The random integrity protection profiles each correspond to a different sequences of UL/DL amounts and intervals that are stored 5GNR AN 411 and UE 401. SMF 424 selects full UL/DL integrity-protection for network slices that handle high-priority data like financial transaction slices. SMF 424 selects from among various different random integrity-protection profiles for network slices that handle medium-priority data like common video-surveillance. SMF 424 selects no integrity-protection for network slices that handle low-priority data like best-effort internet access. SMF 424 signals UE context for the sessions to UPFs 425-426 for respective slices A and B.

Over AMF 421, SMF 424 transfers N2 signaling to 5GNR AN 411 that indicates the UE context and random integrity-protection profiles for the UE sessions for UE 401. 5GNR AN 411 translates the random integrity-protection profiles into instructions for the sequence of UL/DL intervals and amounts. The instructions may indicate the intervals and amounts or how to calculate the intervals and amounts. The instructions may direct 5GNR AN 411 to randomly select intervals and amounts within interval and amount boundaries for the profile. 5GNR AN 411 wirelessly transfers RRC signaling to UE 401 that indicates the UE context and the random data integrity protection intervals and amounts for the UE sessions (or how to calculate them).

UPF 425 receives DL data for UE 401 and slice A from an external system (not shown). UPF 425 transfers the user data to 5GNR AN 411 per the UE context. 5GNR AN 411 generates DL data units from the DL data for slice A. 5GNR AN 411 randomly selects the appropriate amounts of the DL data units for the corresponding DL intervals per the profile for slice A. 5GNR AN 411 calculates integrity data for the randomly selected DL data units. The integrity data comprises a hash of the DL data with a count, direction, key, and bearer ID. 5GNR AN 411 duplicates the protected DL data units. 5GNR AN 411 wirelessly transfers the DL data units for slice A to UE 401 per the UE context and DL intervals.

UE 401 wirelessly receives the DL data units for slice A from 5GNR AN 411. UE 401 soft-combines the duplicate DL data units. UE 401 allocates the DL data units into their intervals for slice A by sequence number. UE 401 verifies the data integrity for the protected DL data units by re-calculating their integrity data and matching their integrity data to the re-calculated integrity data. DL data units with integrity protection data that fail integrity verification are not considered to be integrity-protected. UE 401 verifies the data integrity for unprotected DL data units by confirming that the amounts of the protected DL data units meets or exceeds the amounts specified by the profile for the DL intervals. For the purpose of determining the amount of protected DL data units, UE 401 detects any missing DL data units for the interval based on gaps in data unit sequence numbering and assumes that these missing DL data units had data integrity information that would have been verified. The missing DL data units are counted as protected DL data units. A DL interval that has fewer protected DL data units than specified does not have data integrity and triggers a data integrity alarm. UE 401 consumes the DL data from the verified DL data units.

UE 401 generates Uplink (UL) data for slice A. UE 401 generates UL data units from the UL data for slice A. UE 401 randomly selects the appropriate amounts of the UL data units for the corresponding UL intervals per the profile for slice A. UE 401 calculates integrity data for the randomly selected UL data units. The integrity data comprises a hash of the UL data with a count, direction, key, and bearer ID. UE 401 duplicates the protected UL data units. UE 401 wirelessly transfers the UL data units for slice A to 5GNR AN 411 per the UE context and UL intervals.

5GNR AN 411 wirelessly receives the UL data units for slice A from UE 401. 5GNR AN 411 soft-combines the duplicate protected UL data units. 5GNR AN 411 allocates the UL data units into their UL intervals for slice A by sequence number. 5GNR AN 411 verifies the data integrity for protected UL data units by re-calculating their integrity data and matching their integrity data from the UL data units to the re-calculated integrity data. UL data units with integrity protection data that fail integrity verification are not considered to be integrity-protected. 5GNR AN 411 verifies the data integrity for the unprotected UL data units by confirming that the amounts of the protected UL data units meets or exceeds the amounts specified by the profile for the UL intervals. For the purpose of determining the amount of protected UL data units, 5GNR AN 411 detects any missing UL data units for the interval based on gaps in data unit sequence numbering and assumes that these missing UL data units had data integrity information that would have been verified. The missing UL data units for the UL interval are counted as protected UL data units. An UL interval that has fewer protected UL data units than specified does not have data integrity and triggers a data integrity alarm. 5GNR AN 411 transfers the UL data from the verified UL data units to UPF 425 for slice A. UPF 425 for slice A transfers the UL data from the verified UL data units to the external system.

For slice B provided by UPF 426, the same general operation could be used. The random data integrity protection that is used for slice B could be the same or different from the random data integrity protection that is used for slice A. The UL/DL intervals and amounts for slice B may vary over time and be the same or different from the UL/DL intervals and amounts for slice A.

Figure 5:
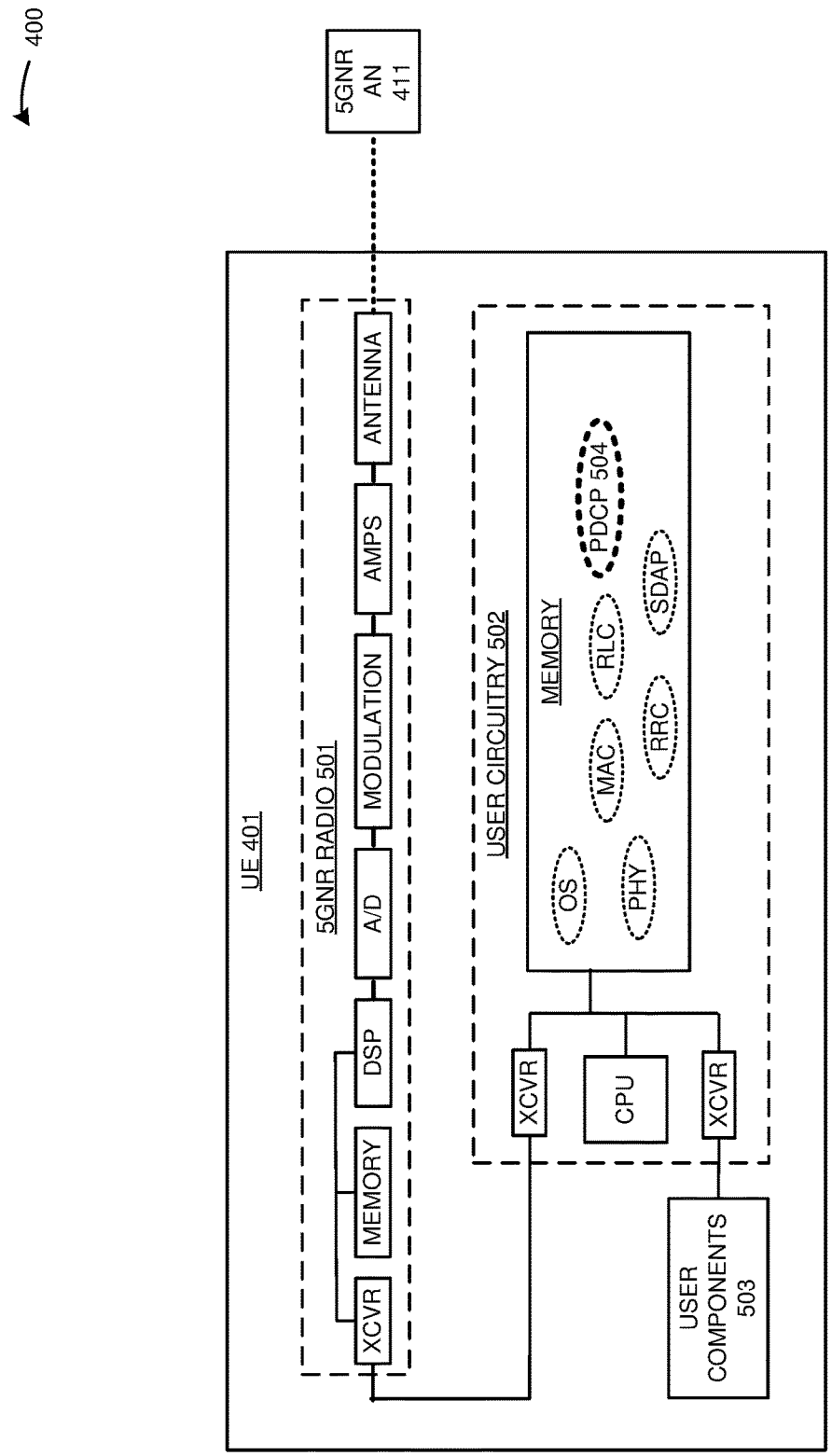
FIG. 5 illustrates an exemplary 5GNR UE in the 5G communication network.

FIG. 5 illustrates exemplary 5G New Radio (NR) UE 401 in 5G communication network 400. Wireless UE 401 comprises an example of wireless UE 101, although UE 101 may differ. Wireless UE 401 comprises 5GNR radio 501, user circuitry 502, and user components 503. User components 503 comprise sensors, controllers, displays, or some other user apparatus that generates and/or consumes user data. Radio 501 comprises an antenna, amplifiers, filters, modulation, analog-to-digital interfaces, DSP, memory, and transceivers that are coupled over bus circuitry. User circuitry 502 comprises CPU, memory, and transceivers (XCVRs) that are coupled over bus circuitry. The memory in user circuitry 502 stores an operating system (OS), Physical Layer (PHY), Media Access Control (MAC), Radio Link Control (RLC), Packet Data Convergence Protocol (PDCP) 504, Radio Resource Control (RRC), and Service Data Adaption Protocol (SDAP). The transceiver in radio 501 is coupled to a transceiver in user circuitry 502. The transceiver in user circuitry 502 is coupled to user components 503. The CPU in user circuitry 502 executes the operating system, PHY, MAC, RLC, PDCP 504, RRC, and SDAP to exchange network signaling and user data messages with 5GNR AN 411 over 5GNR radio 501. In particular, PDCP 504 handles random integrity protection for UE 401 as described herein.

Figure 6:
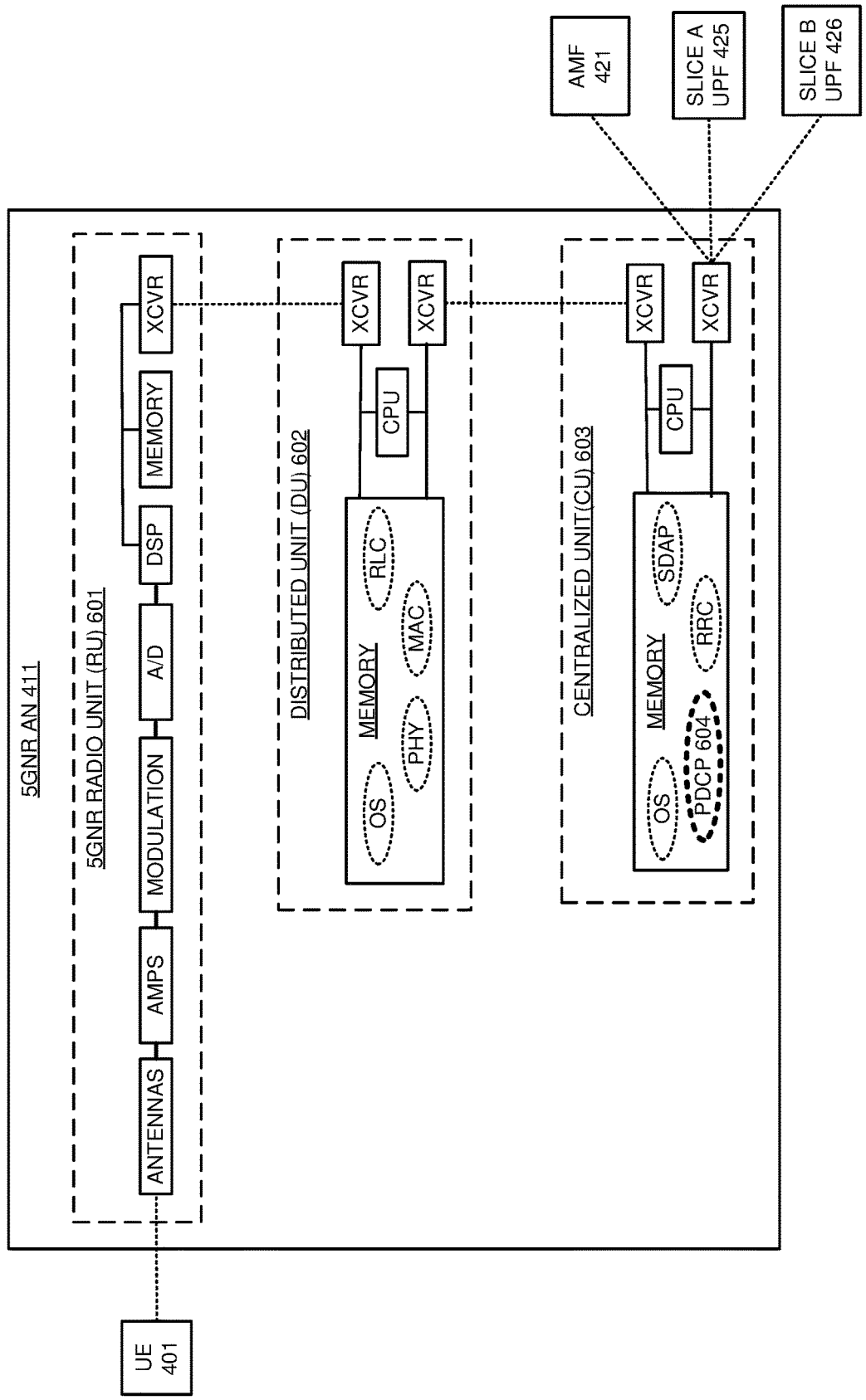
FIG. 6 illustrates exemplary an 5GNR Access Node (AN) in the 5G communication network.

FIG. 6 illustrates exemplary 5GNR Access Node (AN) 411 in 5G communication network 400. 5GNR AN 411 comprises an example of wireless access node 111, although access node 111 may differ. 5GNR AN 411 comprises 5GNR Radio Unit (RU) 601, Distributed Unit (DU) 602, and Centralized Unit (CU) 603. 5GNR RU 601 comprises antennas, amplifiers, filters, modulation, analog-to-digital interfaces, DSP, memory, radio applications, and transceivers that are coupled over bus circuitry. DU 602 comprises memory, CPU, user interfaces and components, and transceivers that are coupled over bus circuitry. The memory in DU 602 stores operating system, PHY, MAC, and RLC. CU 603 comprises memory, CPU, and transceivers that are coupled over bus circuitry. The memory in CU 603 stores an operating system, PDCP 604, RRC, and SDAP. The antennas in 5GNR RU 601 are wirelessly coupled to UE 401 over 5GNR links. Transceivers in 5GNR RU 601 are coupled to transceivers in DU 602. Transceivers in DU 602 are coupled to transceivers in CU 603. Transceivers in CU 603 are coupled AMF 421, slice A UPF 425, and slice B UPF 426. The DSP and CPU in RU 601, DU 602, and CU 603 execute the operating systems, radio applications, PHY, MAC, RLC, PDCP 604, RRC, and SDAP to exchange signaling between UE 401 and AMF 422 and to exchange user data between UE 401 and UPFs 425-426. In particular, PDCP 604 handles random integrity protection for 5GNR AN 411 as described herein.

Figure 7:
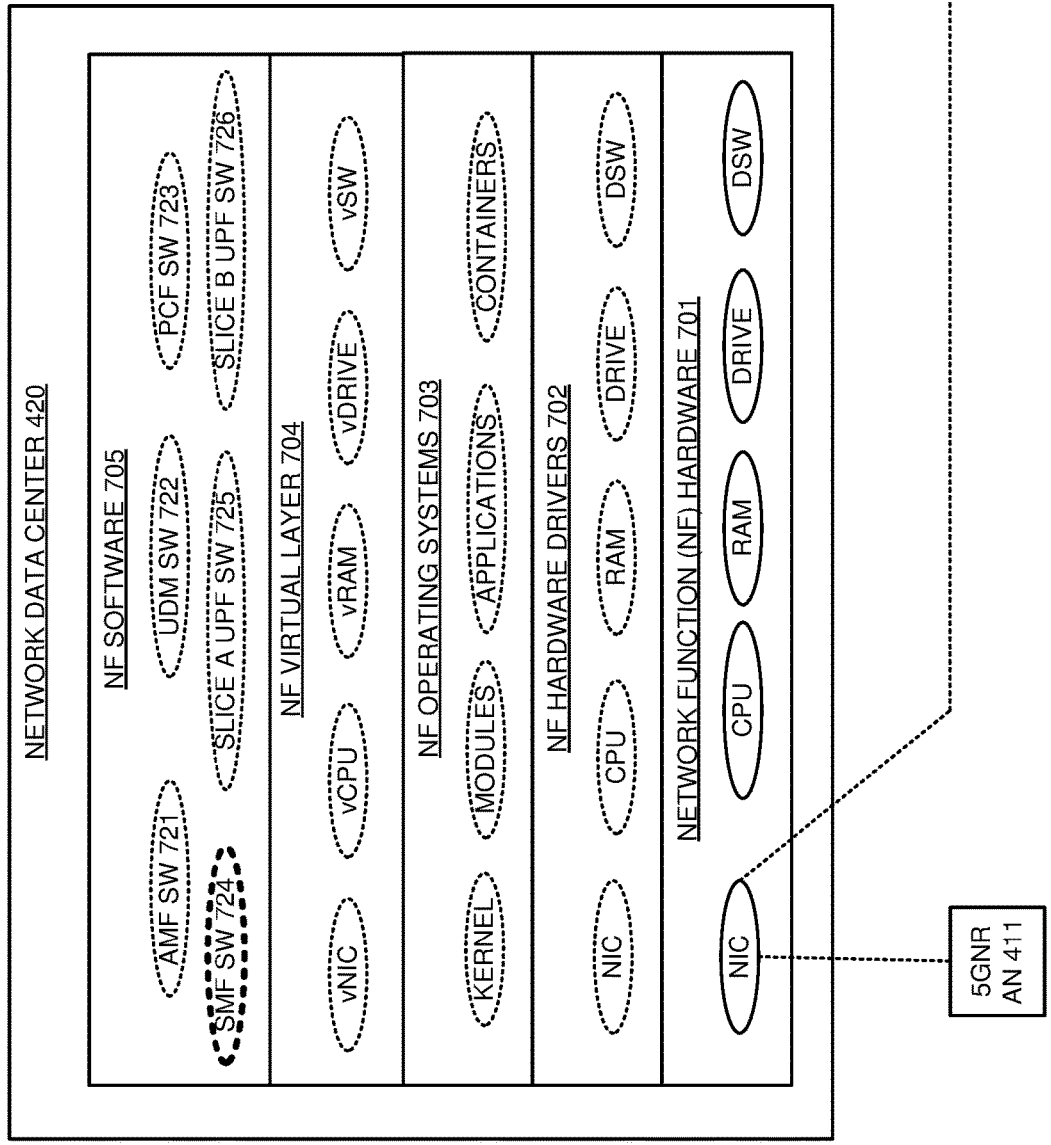
FIG. 7 illustrates an exemplary data center in the 5G communication network.

FIG. 7 illustrates an exemplary data center 420 in 5G communication network 400. Network data center 420 comprises an example of wireless network controller 112, although controller 112 may differ. Network data center 420 comprises Network Function (NF) hardware 701, NF hardware drivers 702, NF operating systems 703, NF virtual layer 704, and NF Software (SW) 705. NF hardware 701 comprises Network Interface Cards (NICs), CPU, RAM, Flash/Disk Drives (DRIVE), and Data Switches (DSW). NF hardware drivers 702 comprise software that is resident in the NIC, CPU, RAM, DRIVE, and DSW. NF operating systems 703 comprise kernels, modules, and applications that form containers for virtual layer and NF software execution. NF virtual layer 704 comprises vNIC, vCPU, vRAM, vDRIVE, and vSW. NF SW 705 comprises AMF SW 721, UDM SW 722, PCF SW 723, SMF SW 724, slice A UPF SW 725, and slice B UPF SW 726. Other NF SW like Network Repository Function (NRF) SW are typically present but are omitted for clarity. Network data center 420 may be located at a single site or be distributed across multiple geographic locations. The NIC in NF hardware 701 are coupled to 5GNR AN 411 and external systems. NF hardware 701 executes NF hardware drivers 702, NF operating systems 703, NF virtual layer 704, and NF SW 705 to form and operate AMF 421, UDM 422, PCF 423, SMF 424, UPF 425, and UPF 426. In particular, SMF 424 controls random integrity protection between UE 401 and 5GNR AN 411 as described herein.

Figure 8:
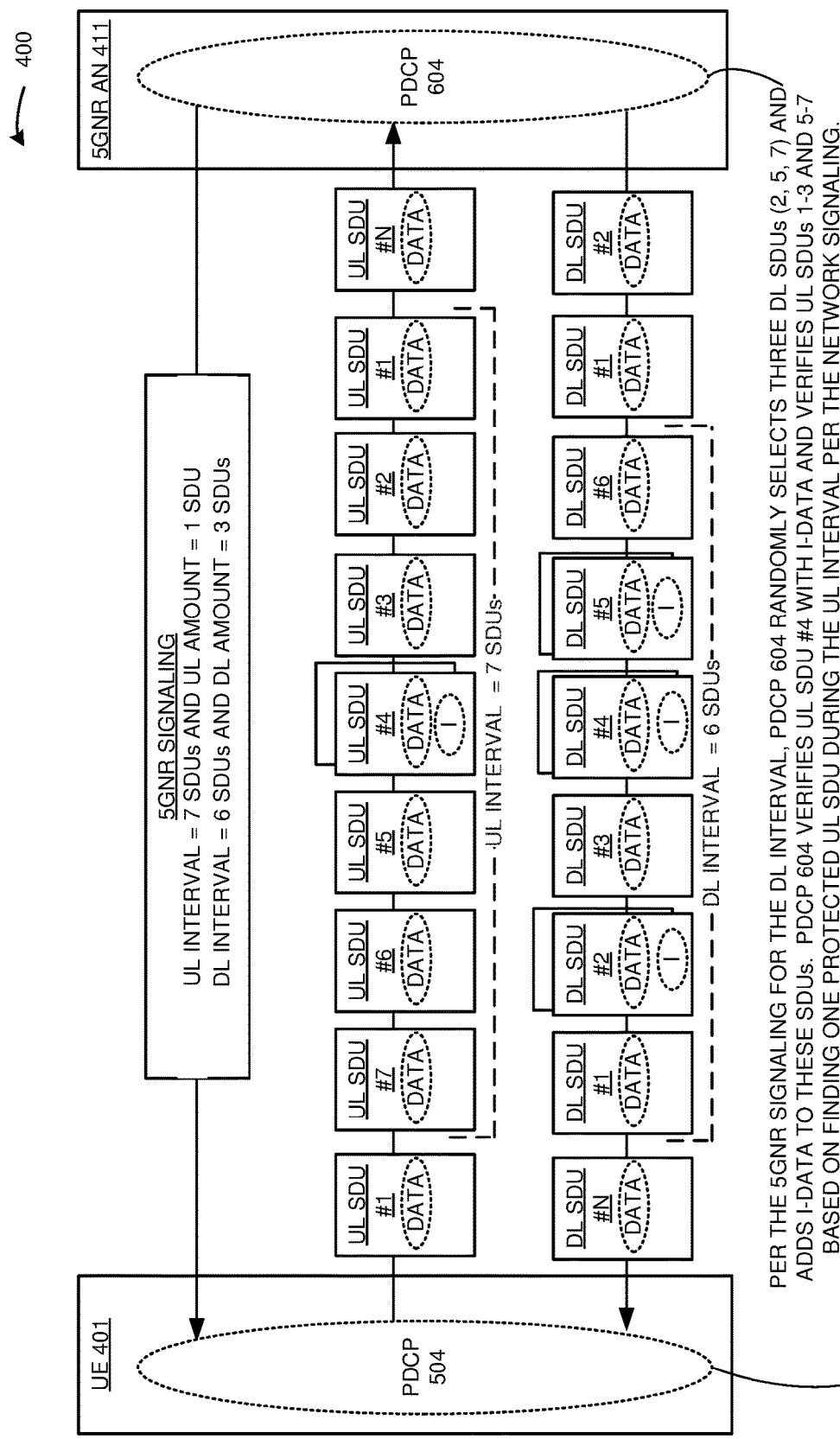
FIG. 8 illustrates an exemplary operation of Packet Data Convergence Protocols (PDCPs) in the wireless UEs and the 5GNR AN to serve the random data integrity protection to the wireless UEs.

FIG. 8 illustrates an exemplary operation of Packet Data Convergence Protocol (PDCP) 504 in wireless UE 401 and PDCP 604 in 5GNR AN 411 to serve the random data integrity protection to wireless UE 401. The operation may differ in other examples. In 5GNR AN 411, PDCP 604 determines UL/DL amounts and intervals for random integrity protection. PDCP 604 signals the UL/DL amounts and intervals for random integrity protection to PDCP 504 in UE 401. In this example, the current UL interval is seven (7) Service Data Units (SDUs), and the current UL amount is one (1) protected SDU. The current DL interval is six (6) SDUs, and the current DL amount is three (3) protected SDUs.

In UE 401, PDCP 504 allocates UL data into UL SDUs and allocates the UL SDUs into the UL interval of seven SDUs. PDCP 504 randomly selects UL SDU #4 for integrity protection from the SDUs in the UL interval. PDCP 504 stops the random selection when the specified UL amount of one protected SDU is reached for the UL interval of seven SDUs. PDCP 504 may use a random number generator to randomly select SDUs by selecting when the random number is odd and not selecting when the random number is even. In 5GNR AN 411, PDCP 604 allocates the UL data units into the UL interval of seven SDUs. PDCP 604 verifies the integrity data in UL SDU #4. UL SDU #4 is not counted as integrity-protected if the verification fails. PDCP 604 confirms that the actual amount of one protected UL SDU met the specified number of one UL SDU for the interval of seven UL SDUs. PDCP 604 verifies the data integrity of UL SDUs #1-7 based on the verified integrity data in UL SDU #4 and based on at least one protected UL SDU being present in the interval of seven UL SDUs.

In 5GNR AN 411, PDCP 604 allocates DL data into DL SDUs and allocates the DL SDUs into a DL interval of six SDUs. PDCP 604 randomly selects DL SDUs #2, 4, and 6 for integrity protection and stops the random selections when the DL amount of three protected SDUs is reached for the DL interval of six SDUs. PDCP 604 may use a random number generator to randomly select DL SDUs #2, 4, and 6. In UE 401, PDCP 504 allocates the DL SDUs into the DL interval of six SDUs. PDCP 504 verifies the integrity data in DL SDUs #2, 4, and 6. Individual DL SDUs #2, 4, and 6 are not counted as integrity-protected if their individual verification fails. PDCP 504 confirms that the actual amount of three protected DL SDUs met the specified number of three DL SDUs for the interval of six DL SDUs. PDCP 504 verifies the data integrity of the DL SDUs #1-6 based on the verified integrity data in DL SDUs #2, 4, and 6 and based on at least three protected DL SDUs being present in the DL interval of six DL SDUs.

Figure 9:
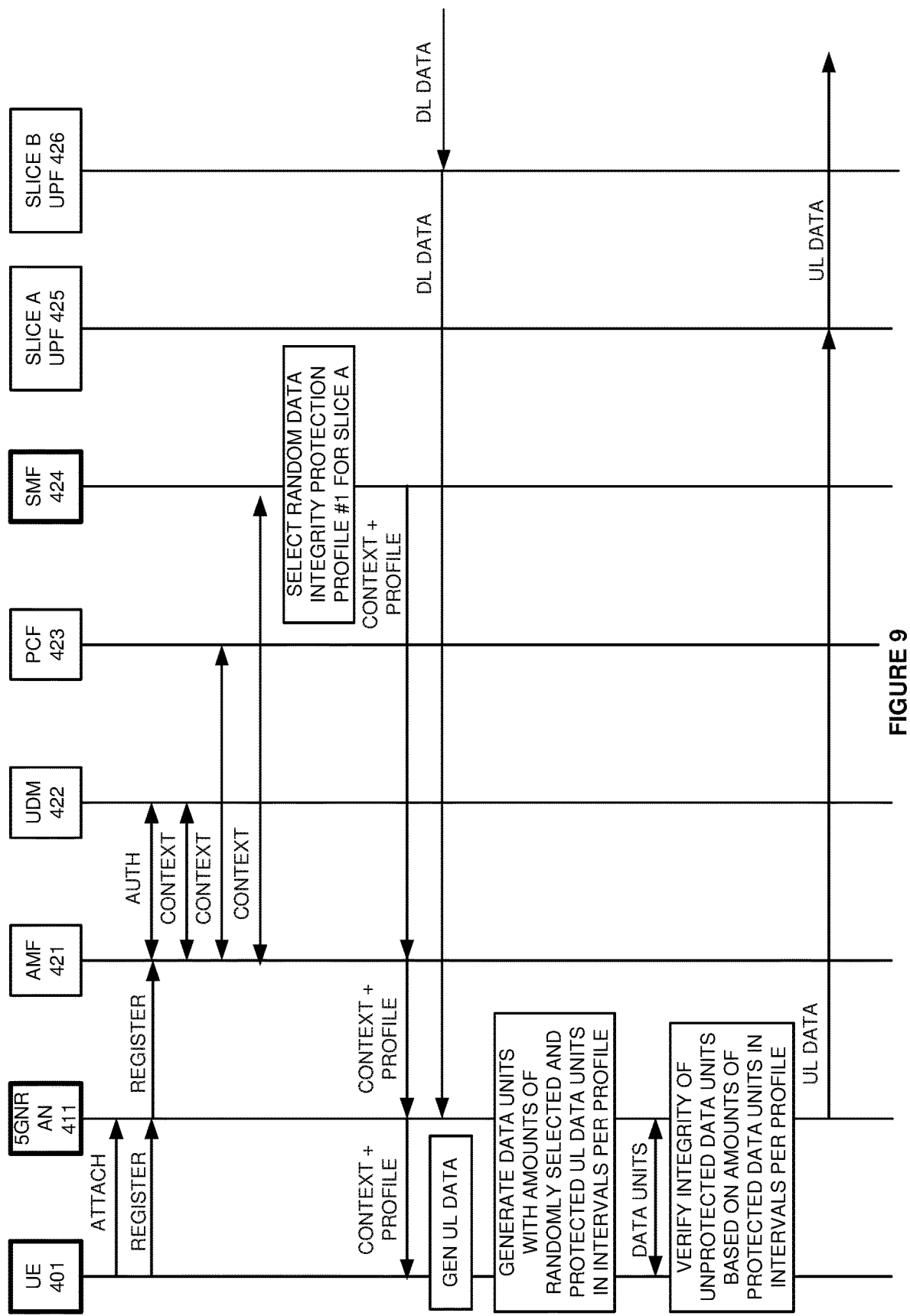
FIG. 9 illustrates an exemplary operation of the 5G communication network to serve the random data integrity protection to the wireless UEs.

FIG. 9 illustrates an exemplary operation of 5G communication network 400 to serve the random data integrity protection to wireless UE 401. The operation may differ in other examples. UE 401 wirelessly attaches to 5GNR AN 411. UE 401 registers with AMF 421 over 5GNR AN 411. AMF 421 interacts with UDM 422 to authorize UE 401 for services and to develop UE context for UE 401. AMF 421 interacts with PCF 423 and SMF 424 to develop additional UE context for UE 401. The UE context specifies slice A, quality parameters, addresses, and the like. A random integrity protection profile corresponds to a sequence of UL/DL amounts and intervals that are stored 5GNR AN 411. SMF 424 selects a random integrity protection profile with full UL/DL integrity-protection for slices that handle high-priority data like financial transaction slices. SMF 424 selects a random integrity-protection profile for slices that handle medium-priority data like common video-surveillance slices. SMF 424 selects a profile with no UL/DL integrity-protection for slices that handle low-priority data like best-effort internet-access slices. In this example, SMF 424 selects random integrity-protection profile #1 for slice A. SMF 424 signals UE context for the session to UPF 425 for slice A.

Over AMF 421, SMF 424 transfers N2 signaling to 5GNR AN 411 that indicates the UE context and random integrity-protection profile #1 for the slice A session for UE 401. 5GNR AN 411 translates the random integrity-protection profile #1 into instructions for the sequence of UL/DL intervals and amounts. The instructions may indicate the intervals and amounts or how to calculate the intervals and amounts. 5GNR AN 411 wirelessly transfers RRC signaling to UE 401 that indicates the UE context and the random data integrity protection profile #1.

For slice A, UPF 425 receives DL data for UE 401 from an external system (not shown). UPF 425 transfers the user data to 5GNR AN 411 per the UE context. 5GNR AN 411 generates DL data units from the DL data for slice A. 5GNR AN 411 randomly selects the appropriate amounts of the DL data units for the corresponding DL intervals per profile #1.

5GNR AN 411 calculates integrity data for the randomly selected DL data units. The integrity data comprises a hash of the data with a count, direction, key, and bearer ID. 5GNR AN 411 duplicates the protected DL data units. 5GNR AN 411 wirelessly transfers the DL data units to UE 401 per the UE context and interval data.

UE 401 generates Uplink (UL) data for slice A. UE 401 generates UL data units from the UL data for slice A. UE 401 randomly selects the appropriate amounts of the UL data units for the corresponding UL intervals per profile #1 for slice A. UE 401 calculates integrity data for the randomly selected UL data units. The integrity data comprises a hash of the data with a count, direction, key, and bearer ID. UE 401 duplicates the protected UL data units. UE 401 wirelessly transfers the UL data units for slice A to 5GNR AN 411 per the UE context and interval data.

UE 401 wirelessly receives the DL data units for slice A from 5GNR AN 411. UE 401 soft-combines the duplicate data units. UE 401 allocates the DL data units into their intervals for slice A. UE 401 verifies the data integrity for protected DL data units by re-calculating their integrity data and matching their integrity data from the DL data units to the re-calculated integrity data. UE 401 verifies the data integrity for unprotected DL data units by confirming that the amounts of protected DL data units meets or exceeds the amounts specified in profile #1 for the DL intervals. For the purpose of determining the amount of protected DL data units, UE 401 detects any missing DL data units by sequence number gaps and assumes that these missing DL data units for the DL interval had data integrity information that would have been verified. A DL interval that has fewer protected DL data units than specified does not have data integrity and triggers a data integrity alarm. UE 401 consumes the DL data from the verified DL data units.

5GNR AN 411 wirelessly receives the UL data units for slice A from UE 401. 5GNR AN 411 soft-combines the duplicate UL data units. 5GNR AN 411 allocates the UL data units into their intervals for slice A. 5GNR AN 411 verifies the data integrity for protected UL data units by re-calculating their integrity data and matching their integrity data from the UL data units to the re-calculated integrity data. 5GNR AN 411 verifies the data integrity for unprotected UL data units by confirming that the amounts of protected UL data units meets or exceeds the amounts specified in profile #1 for the UL intervals. For the purpose of determining the amount of protected UL data units, 5GNR AN 411 detects any mussing UL data units by sequence number gaps and assumes that these missing UL data units for the UL interval had data integrity information that would have been verified. An UL interval that has fewer protected UL data units than specified does not have data integrity and triggers a data integrity alarm. 5GNR AN 411 transfers the UL data from the verified UL data units to UPF 425 for slice A. UPF 425 transfers the UL data from the verified UL data units for slice A to the external system.

Figure 10:
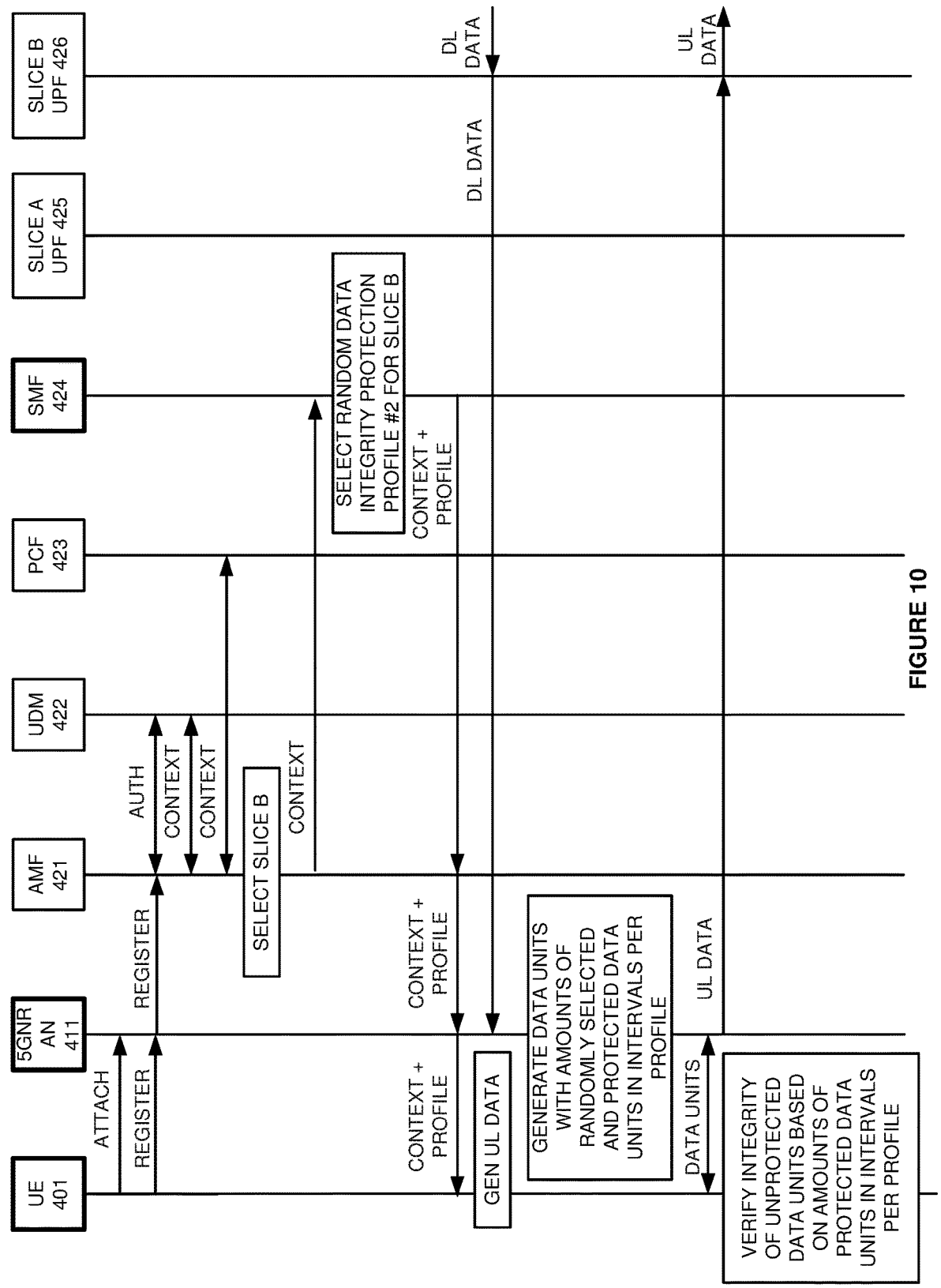
FIG. 10 illustrates an exemplary operation of the 5G communication network to serve the random data integrity protection to the wireless UEs.

FIG. 10 illustrates an exemplary operation of 5G communication network 400 to serve the random data integrity protection to wireless UE 401. The operation may differ in other examples. UE 401 wirelessly attaches to 5GNR AN 411. UE 401 registers with AMF 421 over 5GNR AN 411. AMF 421 interacts with UDM 422 to authorize UE 401 for services and to develop UE context for UE 401. AMF 421 interacts with PCF 423 and SMF 424 to develop additional UE context for UE 401. The UE context specifies slice B, quality parameters, addresses, and the like. SMF 424 selects random integrity-protection profile #2 for slice B. SMF 424 signals UE context for the session to UPF 426 for slice B.

Over AMF 421, SMF 424 transfers N2 signaling to 5GNR AN 411 that indicates the UE context and random integrity-protection profile #2 for the slice B session for UE 401. 5GNR AN 411 translates the random integrity-protection profile #2 into instructions for the sequence of DL intervals and amounts. Profile #2 does not use UL integrity protection. The instructions may indicate the DL intervals and amounts or how to calculate the intervals and amounts. 5GNR AN 411 wirelessly transfers RRC signaling to UE 401 that indicates the UE context and the random data integrity protection profile #2.

For slice B, UPF 426 receives DL data for UE 401 from an external system (not shown). UPF 426 transfers the user data to 5GNR AN 411 per the UE context. 5GNR AN 411 generates DL data units from the DL data for slice B. 5GNR AN 411 randomly selects the appropriate amounts of the DL data units for the corresponding DL intervals per profile #2. 5GNR AN 411 calculates integrity data for the randomly selected DL data units. The integrity data comprises a hash of the data with a count, direction, key, and bearer ID. 5GNR AN 411 duplicates the protected DL data units. 5GNR AN 411 wirelessly transfers the DL data units to UE 401 per the UE context and interval data.

UE 401 generates UL data for slice B. UE 401 generates UL data units from the UL data for slice A. UE 401 wirelessly transfers the UL data units for slice B to 5GNR AN 411 per the UE context—without using integrity protection. 5GNR AN 411 wirelessly receives the UL data units for slice B from UE 401. 5GNR AN 411 transfers the UL data from the UL data units to UPF 426 for slice B. UPF 426 transfers the UL data from the UL data units for slice B to the external system.

UE 401 wirelessly receives the DL data units for slice B from 5GNR AN 411. UE 401 soft-combines the duplicate data units. UE 401 allocates the DL data units into their intervals for slice B. UE 401 verifies the data integrity for protected DL data units by re-calculating their integrity data and matching their integrity data from their DL data unit to their re-calculated integrity data. UE 401 verifies the data integrity for unprotected DL data units by confirming that the amounts of protected DL data units meets or exceeds the amounts specified in profile #2 for the intervals. For the purpose of determining the amount of protected DL data units, UE 401 detects any missing DL data units by sequence number gaps and assumes that these missing DL data units for the interval had data integrity information that would have been verified. A DL interval that has fewer protected DL data units than specified does not have data integrity and triggers a data integrity alarm. UE 401 consumes the DL data from the verified DL data units.

The wireless data network circuitry described above comprises computer hardware and software that form special-purpose wireless communication network circuitry to serve random data integrity protection to wireless UEs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless communication network circuitry to serve random data integrity protection to wireless UEs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve data integrity protection to a User Equipment (UE), the method comprising:
 a network controller selecting random integrity protection profiles for network slices based on data traffic types handled by the network slices,
 the network controller further selecting a random data integrity protection for a UE session of the UE based on a random integrity protection profile selected for a network slice of the UE session and a data integrity protection amount for the wireless network slice of the UE session indicated in the UE context of the UE, and transferring network signaling to a wireless access node that indicates the random data integrity protection for the UE session of the UE;
 the wireless access node receiving the network signaling and wirelessly transferring UE signaling to the UE that indicates the random data integrity protection for the UE session;
 the wireless access node generating downlink data units for a downlink interval, randomly selecting a portion of the downlink data units to reach a downlink amount for the downlink interval, and converting the selected portion of the downlink data units into integrity-protected downlink data units; and
 the wireless access node wirelessly transferring the downlink data units and the integrity-protected downlink data units to the UE, wherein the UE determines the downlink amount of the integrity-protected downlink data units for the downlink interval and determines downlink data integrity of the downlink data units based on the downlink amount of the integrity-protected downlink data units for the downlink interval.

2. The method of claim 1 wherein the wireless access node wirelessly transferring the integrity-protected downlink data units to the UE comprises duplicating the integrity-protected downlink data units and wirelessly transferring the duplicated integrity-protected downlink data units to the UE.

3. The method of claim 1 wherein the network controller selecting the random integrity protection profiles for the network slices based on the data traffic types handled by the network slices comprises the network controller selecting a first profile with full data integrity protection for the network slices that handle high-priority data, selecting as second profile with random data integrity protection amounts for the network slices that handle medium-priority data, and selecting a third profile with no data integrity protection for the network slices that handle low-priority data.

4. The method of claim 1 wherein the wireless access node wirelessly transferring the UE signaling to the UE that indicates the random data integrity protection for the UE session comprises wirelessly transferring the UE signaling to the UE that indicates at least one of the downlink amount and the downlink interval.

5. The method of claim 1 wherein the wireless access node receiving the network signaling that indicates the random data integrity protection for the UE session comprises receiving the network signaling that indicates at least one of the downlink amount and the downlink interval.

6. The method of claim 1 wherein the wireless access node generating the downlink data units for the downlink interval, randomly selecting the portion of the downlink data units to reach the downlink amount for the downlink interval, and converting the selected portion of the downlink data units into the integrity-protected downlink data units comprises a Packet Data Convergence Protocol (PDCP) generating the downlink data units for the downlink interval, randomly selecting the portion of the downlink data units to reach the downlink amount for the downlink interval, and converting the selected portion of the downlink data units into the integrity-protected downlink data units.

7. The method of claim 1 further comprising the wireless access node wirelessly receiving uplink data units and integrity-protected uplink data units, determining an uplink amount of the integrity-protected uplink data units for an uplink interval, and determining uplink data integrity of the uplink data units based on the uplink amount of the integrity-protected uplink data units for the uplink interval.

8. The method of claim 7 wherein the wireless access node wirelessly transferring the UE signaling to the UE that indicates the random data integrity protection for the UE session comprises wirelessly transferring the UE signaling to the UE that indicates at least one of the uplink amount and the uplink interval.

9. The method of claim 7 wherein the wireless access node receiving the network signaling that indicates the random data integrity protection for the UE session comprises receiving the network signaling that indicates at least one of the uplink amount and the uplink interval.

10. The method of claim 7 wherein the wireless access node determining the uplink amount of the integrity-protected uplink data units for the uplink interval and determining the uplink data integrity of the uplink data units based on the uplink amount of the integrity-protected uplink data units for the uplink interval comprises a Packet Data Convergence Protocol (PDCP) determining the uplink amount of the integrity-protected uplink data units for the uplink interval and determining the uplink data integrity of the uplink data units based on the uplink amount of the integrity-protected uplink data units for the uplink interval.

11. A wireless communication network to serve data integrity protection to a User Equipment (UE), the wireless communication network comprising:
- a network controller configured to select random integrity protection profiles for network slices based on data traffic types handled by the network slices;
- the network controller further configured to select a random data integrity protection for a UE session of the UE based on a random integrity protection profile selected for a network slice of the UE session and a data integrity protection amount for the network slice of the UE session indicated in the UE context of the UE and transfer network signaling to a wireless access node that indicates the random data integrity protection for the UE session for the UE;
- the wireless access node configured to receive the network signaling and wirelessly transfer UE signaling to the UE that indicates the random data integrity protection for the UE session;
- the wireless access node configured to generate downlink data units for a downlink interval, randomly select portion the downlink data units to reach a downlink amount for the downlink interval, and convert the selected portion of the downlink data units into integrity-protected downlink data units; and
- the wireless access node configured to wirelessly transfer the downlink data units and the integrity-protected downlink data units to the UE, wherein the UE is configured to determine the downlink amount of the integrity-protected downlink data units for the downlink interval and determine downlink data integrity of the downlink data units based on the downlink amount of the integrity-protected downlink data units for the downlink interval.

12. The wireless communication network of claim 11 wherein the wireless access node is configured to duplicate the integrity-protected downlink data units and wirelessly transfer the duplicated integrity-protected downlink data units to the UE.

13. The wireless communication network of claim 11 wherein the network controller is configured to:
- select a first profile with full data integrity protection for a first plurality of network slices that handle high-priority data;
- select a second profile with random data integrity protection amounts for a second plurality of network slices that handle medium-priority data; and
- select a third profile with no data integrity protection for a third plurality of network slices that handle low-priority data.

14. The wireless communication network of claim 11 wherein the wireless access node is configured to wirelessly transfer the UE signaling to the UE that indicates at least one of the downlink amount and the downlink interval.

15. The wireless communication network of claim 11 wherein the wireless access node is configured to receive the network signaling that indicates least one of the downlink amount and the downlink interval.

16. The wireless communication network of claim 11 wherein the wireless access node comprises a Packet Data Convergence Protocol (PDCP) configured to generate the downlink data units for the downlink interval, randomly select the portion of the downlink data units to reach the downlink amount for the downlink interval, and convert the selected portion of the downlink data units into the integrity-protected downlink data units.

17. The wireless communication network of claim 11 further comprising the wireless access node configured to wirelessly receive uplink data units and integrity-protected uplink data units, determine an uplink amount of the integrity-protected uplink data units for an uplink interval, and determine uplink data integrity of the uplink data units based on the uplink amount of the integrity-protected uplink data units for the uplink interval.

18. The wireless communication network of claim 17 wherein the wireless access node is configured to:
- receive the network signaling that indicates at least one of the uplink amount and the uplink interval; and
- wirelessly transfer the UE signaling to the UE that indicates at least one of the uplink amount and the uplink interval.

19. The wireless communication network of claim 17 wherein the wireless access node comprises a Packet Data Convergence Protocol (PDCP) configured to determine the uplink amount of the integrity-protected uplink data units for the uplink interval and determine the uplink data integrity of the uplink data units based on the uplink amount of the integrity-protected uplink data units for the uplink interval.

20. One or more non-transitory computer-readable storage media having program instructions stored thereon, wherein the program instructions, when executed by a computing system, direct the computing system to perform operations, the operations comprising:
- selecting random integrity protection profiles for network slices based on data traffic types handled by the network slices;
- selecting a random data integrity protection for a UE session of the UE based on a random integrity protection profile selected for a network slice of the UE session and a data integrity protection amount for the network slice of the UE session indicated in UE context of the UE;
- generating network signaling that indicates the random data integrity protection for the UE session of the UE;
- directing a radio to wirelessly transfer UE signaling to the UE that indicates the random data integrity protection for the UE session based on the network signaling;
- generating downlink data units for a downlink interval;
- randomly selecting a portion of the downlink data units to reach a downlink amount for the downlink interval;
- converting the selected portion of the downlink data units into integrity-protected downlink data units; and
- directing a radio to wirelessly transfer the downlink data units and the integrity-protected downlink data units to the UE, wherein the UE determines the downlink amount of the integrity-protected downlink data units for the downlink interval and determines downlink data integrity of the downlink data units based on the downlink amount of the integrity-protected downlink data units for the downlink interval.

\* \* \* \* \*